US012657736B2

(12) United States Patent
Kwon et al.

(10) Patent No.: US 12,657,736 B2
(45) Date of Patent: Jun. 16, 2026

(54) DEVICE AND METHOD FOR DETERMINING VIDEO FOR SPORTS BROADCASTING, AND RECORDING MEDIUM STORING INSTRUCTIONS

(71) Applicant: PIXELSCOPE INC., Seoul (KR)

(72) Inventors: Gee Hwan Kwon, Yongin-si (KR); Kyung Mo Koo, Seoul (KR); Jae Yun Yeo, Yongin-si (KR); Sang Won Lee, Seoul (KR)

(73) Assignee: PIXELSCOPE INC., Seoul (KR)

( * ) Notice: Subject to any disclaimer, the term of this patent is extended or adjusted under 35 U.S.C. 154(b) by 350 days.

(21) Appl. No.: 18/033,156

(22) PCT Filed: Oct. 21, 2021

(86) PCT No.: PCT/KR2021/014784
§ 371 (c)(1),
(2) Date: Apr. 21, 2023

(87) PCT Pub. No.: WO2022/086202
PCT Pub. Date: Apr. 28, 2022

(65) Prior Publication Data
US 2023/0386051 A1 Nov. 30, 2023

(30) Foreign Application Priority Data

| | | |
|---|---|---|
| Oct. 22, 2020 | (KR) | .................. 10-2020-0137212 |
| Apr. 22, 2021 | (KR) | .................. 10-2021-0052395 |
| Jun. 28, 2021 | (KR) | .................. 10-2021-0084172 |

(51) Int. Cl.
*G06T 7/246* (2017.01)
*G06V 20/40* (2022.01)

(52) U.S. Cl.
CPC .............. *G06T 7/246* (2017.01); *G06V 20/42* (2022.01); *G06V 20/47* (2022.01); *G06T 2207/30196* (2013.01); *G06T 2207/30224* (2013.01)

(58) Field of Classification Search
CPC G06T 7/20; G06T 7/292; A63B 71/04; A63B 71/02; G06V 20/42; G06V 40/20;
(Continued)

(56) References Cited

U.S. PATENT DOCUMENTS

| | | | | |
|---|---|---|---|---|
| 2005/0213817 A1* | 9/2005 | Miyamori | ................. | G06T 7/20 |
| | | | | 382/181 |
| 2012/0057852 A1* | 3/2012 | Devleeschouwer | ... | H04N 5/262 |
| | | | | 386/E5.028 |

(Continued)

FOREIGN PATENT DOCUMENTS

| | | |
|---|---|---|
| EP | 1 480 450 A3 | 5/2006 |
| JP | 4200219 B2 | 12/2008 |

(Continued)

OTHER PUBLICATIONS

International Search Report for PCT/KR2021/014784 dated Jan. 28, 2022.

(Continued)

*Primary Examiner* — Kathleen Y Dulaney
(74) *Attorney, Agent, or Firm* — Sughrue Mion, PLLC

(57) ABSTRACT

The present disclosure proposes a device for determining a video for sports broadcasting. The device may acquire ball tracking information for tracking a ball used in the match, from a camera group through a communication circuit; determine a start or end of a rally within the match based on the ball tracking information; according to determination that the rally has started, control the communication circuit to transmit, to a video transmission device, a first video, (Continued)

from among the plurality of videos, which captures the playing space of the match; and, according to determination that the rally is over, control the communication circuit to transmit, to the video transmission device, a second image, from among the plurality of videos, which captures the player who has scored in the rally.

17 Claims, 11 Drawing Sheets

(58) Field of Classification Search
CPC ... G06V 20/46; H04N 21/21805; H04N 5/268
USPC .................................................. 382/103, 181
See application file for complete search history.

(56) References Cited

U.S. PATENT DOCUMENTS

| 2013/0003938 A1 | 1/2013 | Watanabe et al. | |
| 2013/0039538 A1 | 2/2013 | Johnson et al. | |
| 2014/0245367 A1 | 8/2014 | Sasaki et al. | |
| 2014/0315610 A1* | 10/2014 | Shachar | A63B 71/04 |
| | | | 463/7 |
| 2016/0321822 A1* | 11/2016 | Kimura | H04N 23/64 |
| 2017/0178687 A1* | 6/2017 | Tamir | G11B 27/036 |
| 2017/0213087 A1* | 7/2017 | Chen | G06V 20/42 |
| 2018/0154232 A1* | 6/2018 | Gentil | A63B 71/0605 |
| 2019/0182436 A1* | 6/2019 | Gupta | H04N 5/272 |
| 2019/0266407 A1* | 8/2019 | Gupta | G06V 10/82 |
| 2020/0114240 A1* | 4/2020 | Shachar | G06T 7/20 |

FOREIGN PATENT DOCUMENTS

| JP | 2015-14731 A | 1/2015 |
| JP | 2015-82710 A | 4/2015 |
| JP | 2017-513385 A | 5/2017 |
| JP | 2017-212654 A | 11/2017 |
| JP | 2020-54747 A | 4/2020 |
| KR | 10-1888747 B1 | 8/2018 |

OTHER PUBLICATIONS

Bwf Tv, "Diahatsu Yonex Japan Open 2017 | Badminton SF M1-MS | Lee Chong Wei vs Shi Yuqi", 2017, (2 pages), https://www.youtube.com/watch?v=B0xrvAndYrQ.

US Open Tennis Championships, "Daniil Medvedev vs Rafael Nadal Full Match | 2019 US Open Final", 2020, (2 pages), https://www.youtube.com/watch?v=ROaqNQ-12Js.

"Naomi Osaka vs Coco Gauff Full Match US Open 2019 Round 3", YouTube [online] [video], https://www.youtube.com/watch?v=v4lKkudrQlc , Aug. 21, 2020, 5 pages.

* cited by examiner

Video (310)

Third video (320)

First video (150)

Second video (160)

710 — Starting an analysis for a match

720 — Has the primary event occurred? — No

Yes

730 — Storing videos after the time point of the occurrence of the primary event 740 — Has the secondary event occurred? — No Yes 750 — Has the tertiary event occurred? — No Yes 760 — Determining the stored video as the replay video

FIG. 11

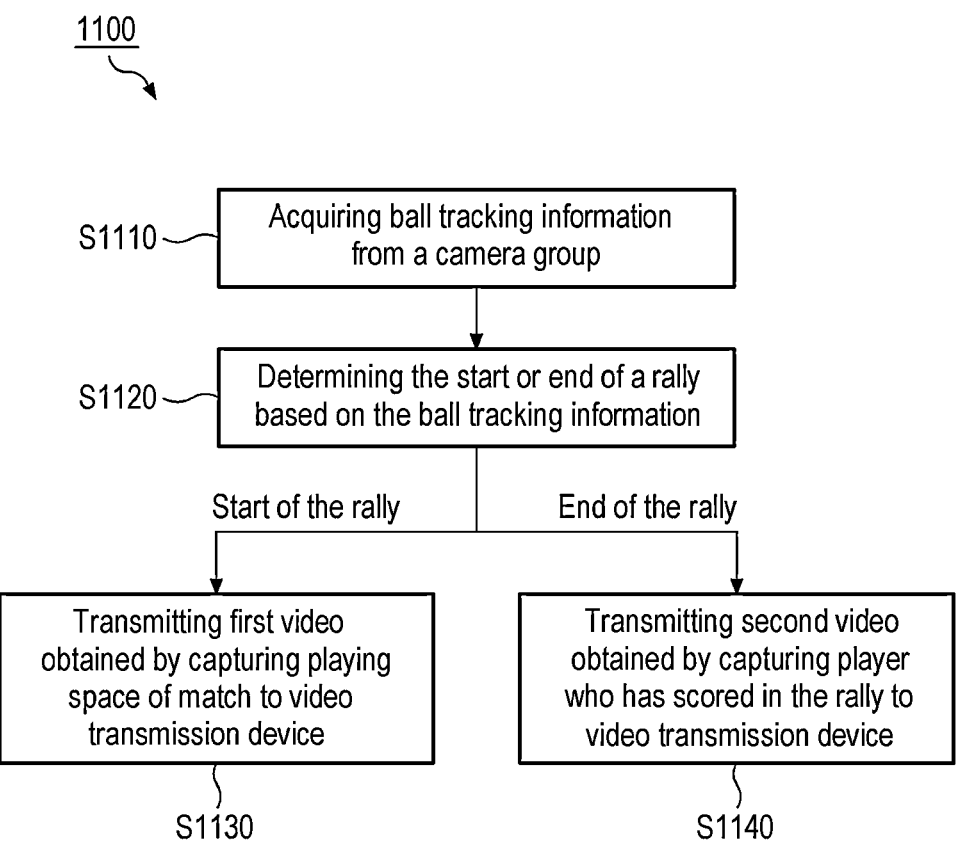

1100

S1110 — Acquiring ball tracking information from a camera group

S1120 — Determining the start or end of a rally based on the ball tracking information Start of the rally                    End of the rally Transmitting first video obtained by capturing playing space of match to video transmission device Transmitting second video obtained by capturing player who has scored in the rally to video transmission device

S1130                    S1140

DEVICE AND METHOD FOR DETERMINING VIDEO FOR SPORTS BROADCASTING, AND RECORDING MEDIUM STORING INSTRUCTIONS

This Application is a National Stage of International Application No. PCT/KR2021/014784 filed Oct. 21, 2021, claiming priority based on Korean Patent Application No. 10-2020-0137212 filed Oct. 22, 2020 and Korean Patent Application No. 10-2021-0052395 filed Apr. 22, 2021 and Korean Patent Application No. 10-2021-0084172 filed Jun. 28, 2021.

TECHNICAL FIELD

The present disclosure relates to techniques for determining videos for sports broadcasting.

BACKGROUND

A camera group including one or more cameras can be used to broadcast a sports match. Each camera of the camera group may be disposed in various positions based on the playing space, and capture diverse objects in the corresponding match at various angles of view. At least one of the various videos generated by the camera group may be determined as a broadcasting video of the corresponding match and transmitted to viewers. At this time, in order for the broadcast for the sports match to be made smooth, it is necessary for a video appropriate for the situation of the corresponding match to be determined as the broadcasting video. In addition, as the situation of the match changes from moment to moment, it is also necessary for other videos to be determined again, so that the switching of broadcasting screens can be properly performed.

The process of determining a video to be transmitted as a broadcasting video among various videos may be performed by humans (e.g., a producer at a broadcast station, etc.). However, the method of determining a broadcasting video by humans may have problems that discretionary judgment of an individual should be relied on, broadcast quality may be affected by individual experience and capabilities, crucial scenes of a match may not be broadcasted by a mistake, etc.

SUMMARY

Various embodiments of the present disclosure provide techniques for determining videos for sports broadcasting.

As one aspect of the present disclosure, a device for determining a video for sports broadcasting may be provided. The device may be a device for determining a video for broadcasting a sports match among a plurality of videos of the match captured by a camera group. The device may include: a communication circuit configured to communicate with the camera group and a video transmission device; one or more processors; and one or more memories configured to store instructions that, when executed by the one or more processors, cause the one or more processors to perform operations, wherein the one or more processors may: acquire ball tracking information for tracking a ball used in the match from the camera group through the communication circuit; determine a start or end of a rally within the match based on the ball tracking information; transmit, according to a determination that the rally has started, a first video obtained by capturing a playing space of the match among the plurality of videos to the video transmission device by controlling the communication circuit; and transmit, according to a determination that the rally has ended, a second video obtained by capturing a player who has scored in the rally among the plurality of videos to the video transmission device by controlling the communication circuit.

In one embodiment, the one or more processors may: acquire player movement information for tracking movements of players from the camera group through the communication circuit before the start of the rally; determine whether the rally is ready to start based on the player movement information; and according to a determination that the rally is ready to start, transmit a third video obtained by capturing a player who gets to serve in the rally among the plurality of videos to the video transmission device by controlling the communication circuit.

In one embodiment, the one or more processors may determine that the rally has started based on whether the ball has traveled vertically upward by a preset distance or more.

In one embodiment, the one or more processors may determine that the rally has started based on whether the ball has touched a playing surface in the playing space within a preset time interval after traveling vertically upward by the preset distance or more.

In one embodiment, the one or more processors may determine that the rally has ended based on playing surface information indicating a playing surface in the playing space and the ball tracking information.

In one embodiment, the one or more processors may determine that the rally has ended if the ball has not touched the other court of the playing surface within a first time interval set in advance after touching one court of the playing surface, or a speed of the ball maintains a certain amount or lower for a second time interval set in advance or longer.

In one embodiment, the one or more processors may: determine, according to a determination that the rally has ended, whether a point has been scored in the rally and a player who has scored the point in the rally based on the playing surface information and the ball tracking information; and update score status information of the match and determine the second video among the plurality of videos based on whether a point has been scored and the player who has scored the point.

In one embodiment, the one or more processors may: determine a player who gets to serve in the next rally of the rally based on information indicating a player who gets to serve in the rally and the updated score status information; and transmit a fourth video obtained by capturing the player who gets to serve in the next rally among the plurality of videos to the video transmission device by controlling the communication circuit after transmitting the second video.

In one embodiment, the one or more processors may: determine the number of times the ball has reciprocated between both courts in the rally based on the ball tracking information; transmit, according to a determination that the number of times the ball has reciprocated is greater than or equal to a first number, a replay video of the rally and the fourth video in sequence to the video transmission device after transmitting the second video; and transmit, according to a determination that the number of times the ball has reciprocated is less than or equal to a second number that is less than the first number, a high-speed camera video obtained by capturing the rally with a high-speed camera and the fourth video in sequence to the video transmission device after transmitting the second video.

In one embodiment, the one or more processors may generate the replay video based on at least one video corresponding to a time interval from a time point at which the rally is determined to have started to a time point at which the rally is determined to have ended among the plurality of videos.

In one embodiment, the one or more processors may: determine an average value of horizontal speeds of the ball in the rally based on the ball tracking information; generate, according to a determination that the average value is greater than or equal to a preset value, a rally analysis video including analysis information on the rally; and transmit the rally analysis video to the video transmission device by controlling the communication circuit before transmitting the fourth video, wherein the analysis information on the rally may include information indicating, in time series, locations where the ball has touched on the playing surface in the rally.

In one embodiment, the one or more processors may: determine that a game including the rally has ended based on the score status information; generate, according to a determination that the game has ended, a game analysis video including analysis information on the game; and transmit the game analysis video to the video transmission device by controlling the communication circuit, wherein the analysis information on the game may include at least one piece of information selected among service directions, service success rates, attack directions, and attack success rates for each player in the game.

As one aspect of the present disclosure, there may be provided a method for determining a video for sports broadcasting. The method may be a method for determining a video for broadcasting a sports match among a plurality of videos of the match captured by a camera group. The method may include: acquiring, by one or more processors, ball tracking information for tracking a ball used in the match from the camera group through a communication circuit; determining, by the one or more processors, a start or end of a rally within the match based on the ball tracking information; transmitting, according to a determination that the rally has started, a first video obtained by capturing a playing space of the match among the plurality of videos to a video transmission device by controlling the communication circuit; and transmitting, according to a determination that the rally has ended, a second video obtained by capturing a player who has scored in the rally among the plurality of videos to the video transmission device by controlling the communication circuit.

In one embodiment, the method may further include: acquiring, by the one or more processors, player movement information for tracking movements of players from the camera group through the communication circuit before the start of the rally; determining, by the one or more processors, whether the rally is ready to start based on the player movement information; and according to a determination that the rally is ready to start, transmitting, by the one or more processors, a third video obtained by capturing a player who gets to serve in the rally among the plurality of videos to the video transmission device by controlling the communication circuit.

In one embodiment, the determining the start or end of the rally within the match may include determining that the rally has started based on whether the ball has touched a playing surface in the playing space within a preset time interval after traveling vertically upward by a preset distance or more.

In one embodiment, the determining the start or end of the rally within the match may include determining that the rally has ended based on playing surface information indicating a playing surface in the playing space and the ball tracking information.

In one embodiment, the transmitting the second video to the video transmission device may include: determining, according to a determination that the rally has ended, whether a point has been scored in the rally and a player who has scored the point in the rally based on the playing surface information and the ball tracking information; and updating score status information of the match and determining the second video among the plurality of videos based on whether a point has been scored and the player who has scored the point.

In one embodiment, the transmitting the second video to the video transmission device may further include: determining a player who gets to serve in the next rally of the rally based on information indicating a player who gets to serve in the rally and the updated score status information; and transmitting a fourth video obtained by capturing the player who gets to serve in the next rally among the plurality of videos to the video transmission device by controlling the communication circuit after transmitting the second video.

In one embodiment, the transmitting the fourth video to the video transmission device may include: determining the number of times the ball has reciprocated between both courts in the rally based on the ball tracking information; transmitting, according to a determination that the number of times the ball has reciprocated is greater than or equal to a first number, a replay video of the rally and the fourth video in sequence to the video transmission device after transmitting the second video; and transmitting, according to a determination that the number of times the ball has reciprocated is less than or equal to a second number that is less than the first number, a high-speed camera video obtained by capturing the rally with a high-speed camera and the fourth video in sequence to the video transmission device after transmitting the second video.

As one aspect of the present disclosure, there may be provided a non-transitory computer-readable recording medium having recorded thereon instructions for determining a video for sports broadcasting. The instructions recorded on the recording medium according to one aspect of the present disclosure are instructions to be executed on a computer that, when executed by one or more processors, may cause the corresponding one or more processors to: acquire ball tracking information for tracking a ball used in a sports match from a camera group through a communication circuit; determine a start or end of a rally within the match based on the ball tracking information; transmit, according to a determination that the rally has started, a first video obtained by capturing a playing space of the match among a plurality of videos of the match captured by the camera group to a video transmission device by controlling the communication circuit; and transmit, according to a determination that the rally has ended, a second video obtained by capturing a player who has scored in the rally among the plurality of videos to the video transmission device by controlling the communication circuit.

According to the techniques of the present disclosure, a video to be transmitted as a broadcasting video can be determined objectively and accurately. In addition, according to the techniques of the present disclosure, it is possible to reduce the probability of missing crucial scenes of sports matches. Accordingly, the broadcasting quality of sports matches can be consistently maintained.

Further, according to the techniques of the present disclosure, it is possible to reduce unnecessary switching of broadcasting videos, thereby reducing the computational load of the entire broadcast system including the video transmission device and the like.

BRIEF DESCRIPTION OF DRAWINGS

FIG. 11 is a diagram illustrating a method of determining broadcast videos according to one embodiment of the present disclosure.

DETAILED DESCRIPTION

Figure 1:
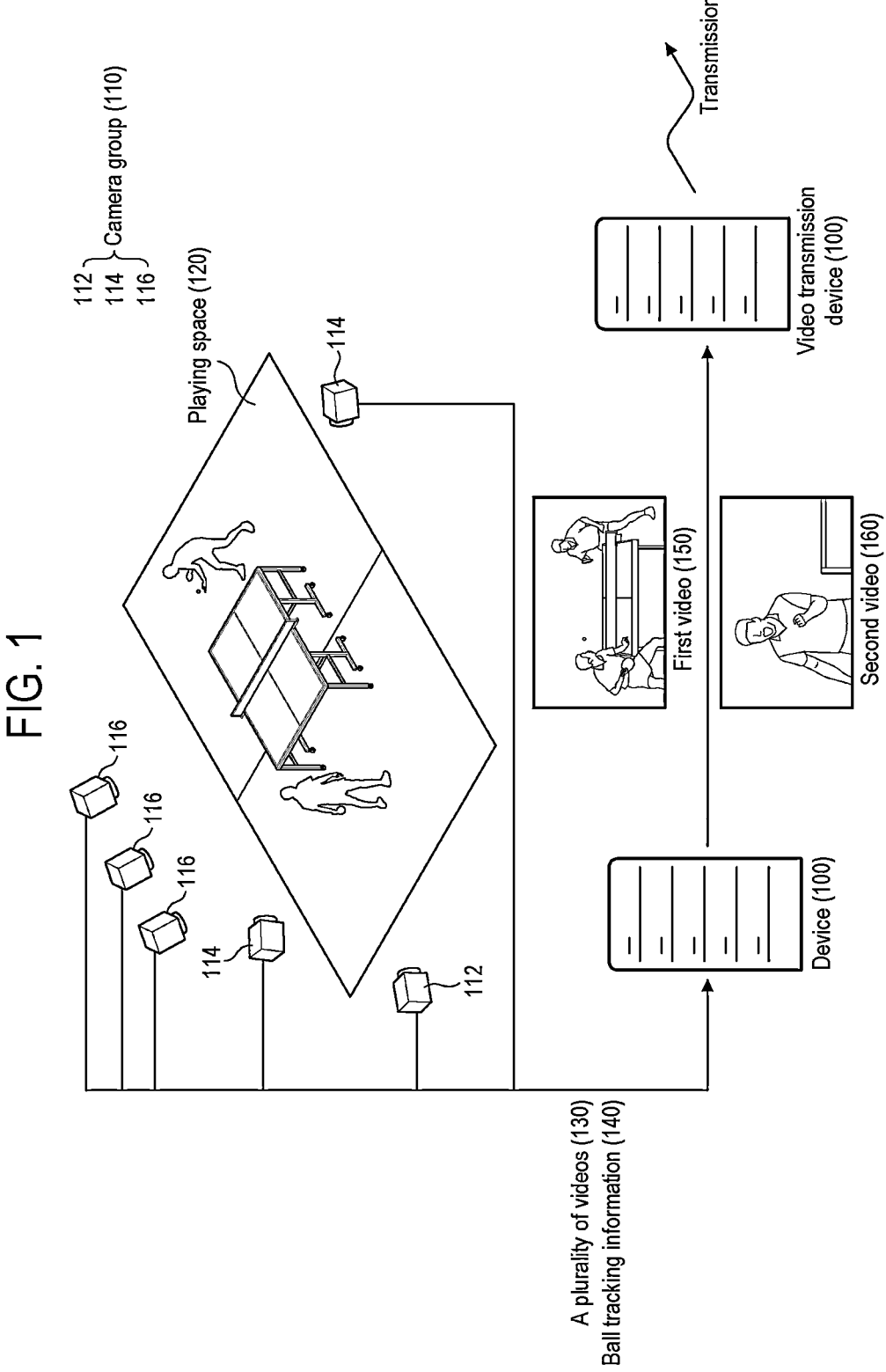
FIG. 1 is a diagram illustrating an operation process of a device according to one embodiment of the present disclosure.

Various embodiments set forth herein are illustrated for the purpose of clearly describing the technical idea of the present disclosure, and are not intended to be limited to particular embodiments. The technical idea of the present disclosure includes various modifications, equivalents, and alternatives of each embodiment set forth herein, and embodiments selectively combined from all or parts of each embodiment. In addition, the scope of the technical idea of the present disclosure is not limited to various embodiments or specific descriptions thereof presented below.

Terms used herein, including technical or scientific terms, may have meanings that are generally understood by a person having ordinary knowledge in the art to which the present disclosure pertains, unless otherwise defined.

Expressions such as "include," "may include," "provided with," "may be provided with," "have," "may have," and the like used herein mean that target features (e.g., functions, operations, components, etc.) exist, and do not exclude the presence of other additional features. In other words, such expressions should be understood as open-ended terms connoting the possibility of including other embodiments.

Singular expressions used herein may include meanings of plurality unless the context indicates otherwise, and the same applies to singular expressions set forth in the claims.

Expressions such as "first," "second," etc., used herein are used to distinguish one object from another when referring to a plurality of objects of the same kind, unless the context indicates otherwise, and are not intended to limit the order or importance among the corresponding objects.

Expressions such as "A, B, and C," "A, B, or C," "A, B, and/or C," or "at least one of A, B, and C," "at least one of A, B, or C," "at least one of A, B, and/or C," "at least one selected from A, B, and C," "at least one selected from A, B, or C," "at least one selected from A, B, and/or C," etc., used herein may refer to each listed item or all possible combinations of listed items. For example, "at least one selected from A and B" may refer to all of (1) A, (2) at least one among A's, (3) B, (4) at least one among B's, (5) at least one among A's and at least one among B's, (6) at least one among A's and B, (7) at least one among B's and A, and (8) A and B. The expression "based on" or "according to" used herein is used to describe one or more factors that affect an action or operation of decision or determination described in a phrase or sentence including the corresponding expression, and this expression does not exclude additional factors that affect the action or operation of the corresponding decision or determination.

As used herein, the expression that a certain component (e.g., a first component) is "connected to" or "coupled with" another component (e.g., a second component) may mean that the certain component may not only be directly connected to or coupled with the another component, but also be connected to or coupled with the another component through yet another component (e.g., a third component).

The expression "configured to" used herein may have the meaning of "being set to," "having the ability to," "being modified to," "being made to," "being capable of," etc., depending on the context. The expression is not limited to the meaning of "designed specifically in hardware" and, for example, a processor configured to perform a particular operation may refer to a special purpose computer structured through programming to perform that particular operation.

In order to describe various embodiments of the present disclosure, a Cartesian coordinate system having an X axis, a Y axis, and a Z axis orthogonal to one another may be defined. Expressions such as "X-axis direction," "Y-axis direction," and "Z-axis direction" of the Cartesian coordinate system used herein may refer to both directions in which each axis of the Cartesian coordinate system extends, unless otherwise defined in that description. In addition, a + sign added before each axial direction may refer to a positive direction, which is one of the two directions extending in the corresponding axial direction, and a − sign added before each axial direction may refer to a negative direction, which is the other direction of the two directions extending in the corresponding axial direction.

Hereinafter, various embodiments of the present disclosure will be described with reference to the accompanying drawings. In the accompanying drawings and description of the drawings, identical or substantially equivalent components may be assigned the same reference numerals. Further, in the following description of various embodiments, repeated descriptions of the identical or corresponding components may be omitted, which, however, does not mean that the corresponding components are not included in those embodiments.

FIG. 1 is a diagram illustrating an operation process of a device 100 according to one embodiment of the present disclosure. The device 100 may determine videos for broadcasting sports matches. Sports in the present disclosure may include various sports to which techniques according to the present disclosure can be applied, such as table tennis and tennis, and are not limited to particular sports. In the following, the techniques of the present disclosure will be described based on table tennis for convenience.

The device 100 may communicate with a camera group 110 and/or a video transmission device 170. The device 100 may acquire a plurality of videos 130 of a corresponding match captured in various ways from the camera group 110. The device 100 may determine a broadcast video to be used for broadcasting the corresponding match among the plurality of videos 130. The device 100 may transmit the determined video to the video transmission device 170. The video transmission device 170 may perform broadcasting for the corresponding match by transmitting the video received from the device 100 to viewers.

The camera group 110 may include one or more cameras. Each camera of the camera group 110 may be disposed in various positions based on a playing space 120 of a sports match, and capture diverse objects at various angles of view. Therefore, the camera group 110 can generate a plurality of videos 130 obtained by capturing the sports match in various ways. In the present disclosure, the playing space 120 is a space in which the corresponding sports match is played, and for example, in the case of table tennis, it may refer to a rectangular parallelepiped space having a length of 14 m, a width of 7 m, and a height of 5 m or more. Each camera may be disposed at a position such as each side of or above the playing space 120. One camera 112 may capture part or all of the playing space 120. Other cameras 114 may each capture players in the match. Other cameras 116 may capture a ball in use in the match and generate ball tracking information 140 for tracking the ball. The ball tracking information 140 in the present disclosure may be information indicating the three-dimensional position of the ball over time within the playing space 120. The ball tracking information 140 may be a video captured while tracking the ball, or may be in the form of information indicating the position of the ball by time. In one embodiment, one camera of the camera group 110 may be a high-speed camera that captures a high-speed camera video. The high-speed camera may be a camera that continuously captures an object at close frame intervals so that the captured videos can be played back at a slow speed without frame degradation. The high-speed camera can create a high-speed camera video by capturing the ball or the players. One (e.g., camera 112, camera 114, etc.) of the cameras described above may be a high-speed camera, or a separate high-speed camera may be provided.

The device 100 may acquire the plurality of videos 130 and the ball tracking information 140 from the camera group 110. The device 100 may determine a video to be used for broadcasting the match among the plurality of videos 130 based on the ball tracking information 140 and the like. In one embodiment, the device 100 may determine whether a rally in the corresponding match has started or ended, based on the ball tracking information 140.

According to a determination that the rally has started, the device 100 may determine a video (hereinafter referred to as a first video 150) obtained by capturing the playing space 120 in which the corresponding match is taking place among the plurality of videos 130 as a video to be broadcasted currently, and transmit the first video 150 to the video transmission device 170. In one embodiment, the first video 150 may be a video obtained by capturing part or all of the playing space 120. Further, according to a determination that the rally has ended, the device 100 may determine a video (hereinafter referred to as a second video 160) obtained by capturing a player who has scored in the corresponding rally among the plurality of videos 130 as a video to be broadcasted currently, and transmit the second video 160 to the video transmission device 170.

The video transmission device 170 may perform broadcasting for the corresponding match by transmitting the videos (e.g., the first video 150, the second video 160, etc.) received from the device 100 to viewers. The video transmission device 170 in the present disclosure may be broadcasting equipment that transmits broadcasting videos to TVs in real-time, or a server that provides or streams in real-time broadcasting videos to each terminal (e.g., smartphones) over an Internet network.

Figure 2:
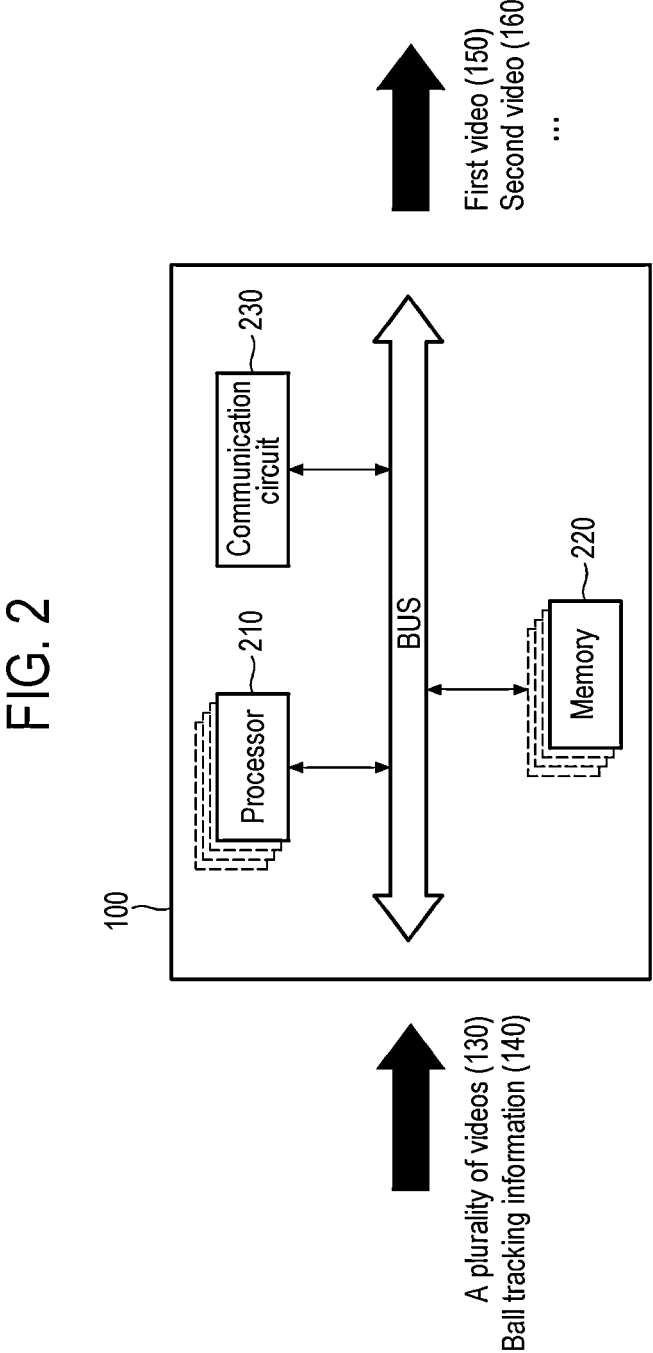
FIG. 2 is a view showing a block diagram of a device according to one embodiment of the present disclosure.

FIG. 2 is a view showing a block diagram of a device 100 according to one embodiment of the present disclosure. In one embodiment, the device 100 may include a communication circuit 230, one or more processors 210, and/or one or more memories 220 as components. In one embodiment, at least one of the components of the device 100 may be omitted or other components may be added to the device 100. In one embodiment, additionally or alternatively, some components may be implemented in combination, or implemented in a singular entity or multiple entities. In the present disclosure, the one or more processors 210 may be expressed as a processor 210. The expression "processor 210" may refer to a set of one or more processors, unless the context clearly indicates otherwise. In the present disclosure, the one or more memories 220 may be expressed as a memory 220. The expression "memory 220" may refer to a set of one or more memories, unless the context clearly indicates otherwise. In one embodiment, at least some of the components inside/outside the device 100 may be connected to each other through a bus, general purpose input/output (GPIO), serial peripheral interface (SPI), mobile industry processor interface (MIPI), or the like, and exchange information (data, signals, etc.).

The communication circuit 230 may perform wireless or wired communication between the device 100 and the camera group 110 or between the device 100 and the video transmission device 170. For example, the communication circuit 230 may perform wireless communication according to a scheme such as eMBB (enhanced Mobile Broadband), URLLC (Ultra Reliable Low-Latency Communications), MMTC (Massive Machine Type Communications), LTE (Long-Term Evolution), LTE-A (LTE Advance), NR (New Radio), UMTS (Universal Mobile Telecommunications System), GSM (Global System for Mobile communications), CDMA (Code Division Multiple Access), WCDMA (Wideband CDMA), WiBro (Wireless Broadband), WiFi (Wireless Fidelity), Bluetooth, NFC (Near Field Communication), GPS (Global Positioning System), or GNSS (Global Navigation Satellite System). For example, the communication circuit 230 may perform wired communication according to a scheme such as USB (Universal Serial Bus), HDMI (High-Definition Multimedia Interface), RS-232 (Recommended Standard-232), or POTS (Plain Old Telephone Service).

The processor 210 may control at least one component of the device 100 connected to the processor 210 by driving software (e.g., instructions, programs, etc.). In addition, the processor 210 may perform operations such as various calculations, manipulation, data generation, and processing related to the present disclosure. Further, the processor 210 may store or load data, etc. to or from the memory 220. In one embodiment, the processor 210 may: acquire ball tracking information 140 for tracking a ball used in the corresponding match from the camera group 110 through the communication circuit 230; determine the start or end of a rally within the match based on the ball tracking information 140; according to a determination that the rally has started, transmit a first video 150 among a plurality of videos 130 to the video transmission device 170 by controlling the communication circuit 230; and according to a determination that the rally has ended, transmit a second video among the plurality of videos 130 to the video transmission device by controlling the communication circuit 230.

The memory 220 may store various data. The data stored in the memory 220 are data acquired, processed, or used by at least one component of the device 100, and may include software (e.g., commands, programs, etc.). The memory 220 may include volatile and/or non-volatile memory. In the present disclosure, a command or program is software stored in the memory 220, and may include an operating system for controlling the resources of the device 100, applications, middleware that provides various functions to the applications so that the applications can utilize the resources of the device 100, and/or the like. In one embodiment, the memory 220 may store instructions that, when executed by the processor 210, cause the processor 210 to perform operations. In one embodiment, the memory 220 may store various pieces of information necessary for implementing the techniques of the present disclosure, such as the plurality of videos 130, the ball tracking information 140, and the like.

In one embodiment, the device 100 may be a device of various forms. For example, the device 100 may be a computer device, a server, a portable communication device, a device according to a combination of the foregoing devices, or a chip, board, circuit, etc., within the foregoing devices. However, the device 100 of the present disclosure is not limited to the devices described above.

The present disclosure may provide a system including the camera group 110 and the device 100. Further, the present disclosure may also provide a system including the camera group 110, the device 100, and the video transmission device 170. Corresponding systems also fall within the scope of the present disclosure.

Figure 3:
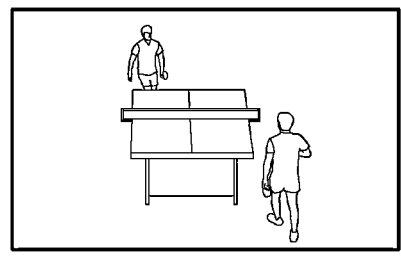
FIG. 3 is a diagram illustrating a process of determining broadcast videos according to one embodiment of the present disclosure.
Figure 3:
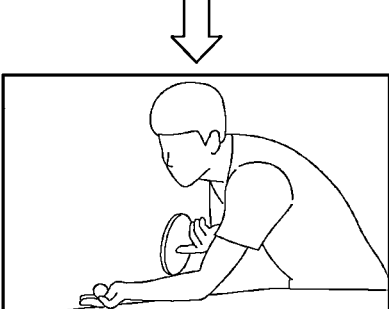
Figure 3:
Figure 3:
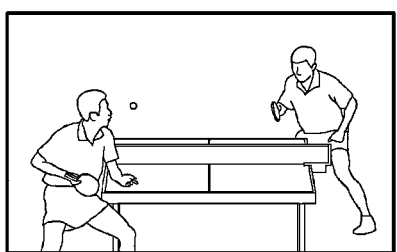
Figure 3:
Figure 3:

FIG. 3 is a diagram illustrating a process of determining broadcast videos according to one embodiment of the present disclosure. As described above, the processor 210 of the device 100 may determine a video for broadcasting that is appropriate for the situation of a sports match among the plurality of videos 130.

In one embodiment, the processor 210 may determine whether a rally is ready to start before the rally starts. The processor 210 may then determine a video suitable for the start-ready state of the rally and transmit the video to the video transmission device. Specifically, the processor 210 may acquire player movement information for tracking movements of players from the camera group 110 through the communication circuit 230 prior to the start of the rally. In the present disclosure, the player movement information may be information indicating the movements of players in the match. For example, the player movement information may be videos obtained by capturing movements or the like of the arms and legs of players, or information obtained by recording positions and postures of the arms and legs over time. The camera group 110 may capture players and generate player movement information.

The processor 210 may determine whether a rally is ready to start based on the player movement information. In one embodiment, the processor 210 may determine that the rally is ready to start if one of the players takes a service preparation motion. The memory 220 may store, in advance, information indicating movements corresponding to service preparation motions. The processor 210 may determine whether a rally is ready to start based on the information indicating the movement corresponding to the service preparation motion and the player movement information.

In one embodiment, the processor 210 may also determine that a rally is ready to start when each player is positioned at a designated position for the rally (e.g., behind a particular end line based on a table tennis table). The memory 220 may store information indicating the score status of the match and the designated position of each player in the immediately preceding rally. The processor 210 may determine where each player should be positioned in the playing space 120 based on the corresponding information. The processor 210 may determine that a rally is ready to start when each player is positioned at a designated position for the rally based on the player movement information. In one embodiment, the processor 210 may also determine that a rally is ready to start upon receiving a signal indicating that the rally is ready to start from the outside.

In one embodiment, the processor 210 may acquire umpire movement information from the camera group 110 through the communication circuit 230. The umpire movement information may be information indicating the movements of umpires. For example, the umpire movement information may be videos obtained by capturing movements or the like of arms and legs of umpires, or information obtained by recording positions and postures of the arms and legs over time. The camera group 110 may capture umpires and generate umpire movement information. The processor 210 may determine whether a rally is ready to start based on the player movement information and/or the umpire movement information. For example, it may be determined that a rally is ready to start when the umpire takes a particular action, makes a hand signal, or the like.

According to a determination that a rally is ready to start, the processor 210 may control the communication circuit 230 to determine a video (hereinafter referred to as a third video 320) obtained by capturing a player who gets to serve in the corresponding rally among the plurality of videos 130 as a video to be broadcasted currently. The processor 210 may transmit the corresponding third video 320 to the video transmission device 170. Accordingly, the video transmission device 170 may stop the transmission of the video (e.g., the video 310 obtained by capturing the playing space, etc.) that was being transmitted previously and start transmitting the third video 320.

Thereafter, as described above, the processor 210 may determine the start or end of the corresponding rally, and transmit a video appropriate therefor to the video transmission device so as to be transmitted to viewers. That is, the processor 210 may determine whether a rally has started based on the ball tracking information 140 after transmitting the third video 320. According to a determination that the rally has started, the processor 210 may transmit a first video 150 obtained by capturing the playing space 120 to the video transmission device 170. Accordingly, the video transmission device 170 may stop the transmission of the third video 320 that was being transmitted previously and start transmitting the first video 150.

Further, the processor 210 may determine whether the rally has ended based on the ball tracking information 140 after transmitting the first video 150. According to a determination that the rally has ended, the processor 210 may transmit the second video 160 obtained by capturing the player who has scored in the corresponding rally to the video transmission device 170. Accordingly, the video transmission device 170 may stop the transmission of the first video 150 that was being transmitted previously and start transmitting the second video 160.

Figure 4:
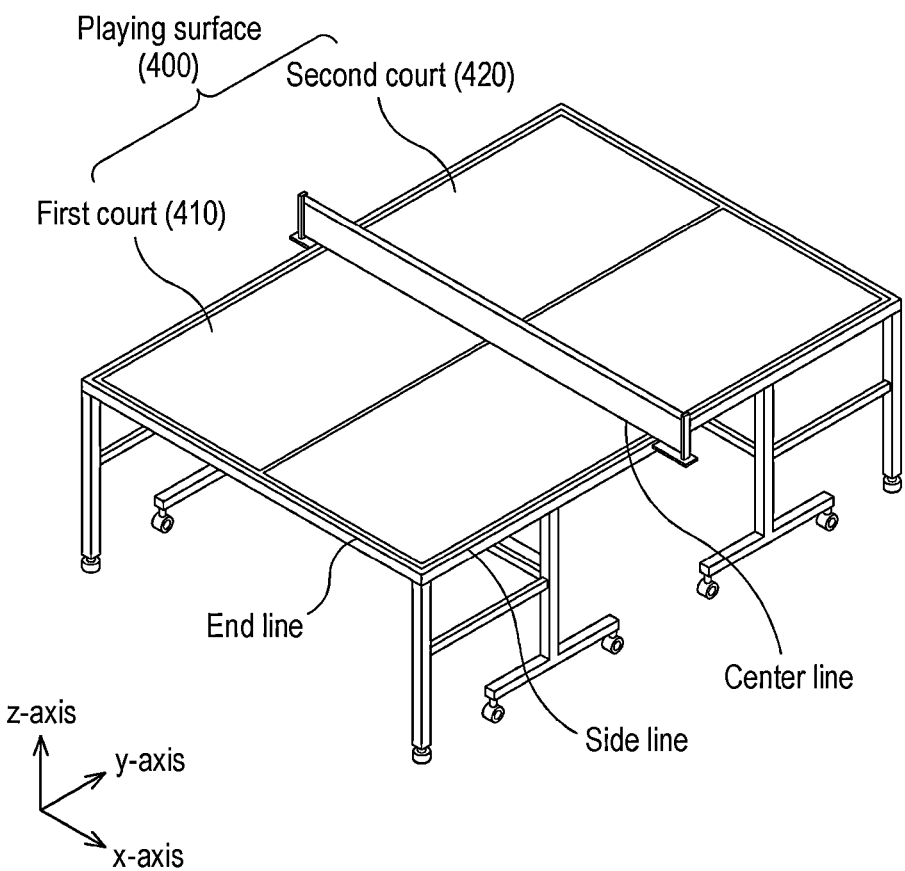
FIG. 4 is a diagram illustrating a playing surface for a sports match according to one embodiment of the present disclosure.

FIG. 4 is a diagram illustrating a playing surface 400 for a sports match according to one embodiment of the present disclosure. The playing surface 400 is an area in the playing space 120 that serves as a reference for various decisions related to points scored or lost, and the playing surface 400 can be divided into a first court 410 and a second court 420 based on the center line. For example, the playing surface 400 may be the upper surface of a table tennis table in the case of table tennis, and the playing surface 400 may be a tennis court conforming to a predetermined standard in the case of tennis. As described above, the description will be made based on table tennis for convenience of description.

The processor 210 of the device 100 may determine whether a rally has started based on the ball tracking information 140 in various ways. In one embodiment, the processor 210 may determine that a rally has started based on whether a ball has touched the playing surface 400 in the start-ready state of the rally. The processor 210 may determine whether the ball has touched the playing surface 400 based on the ball tracking information 140. For example, the processor 210 may determine whether the ball has touched the playing surface 400 by comparing the position of the ball on the z-axis with position information of the playing surface 400. The memory 220 may store the position information of the playing surface 400 in advance.

In one embodiment, the processor 210 may determine that a rally has started based on whether the ball has traveled vertically upward by a preset distance or more. For example, if the ball has traveled substantially vertically upward by 16 cm or more after leaving the hand of a serving player, the processor 210 may determine that a rally has started. In one embodiment, it may also be determined that a rally has started when the ball has traveled vertically upward by a preset distance or more in the start-ready state of the rally. In one embodiment, the processor 210 may also determine that a rally has started based on whether the ball has touched the playing surface 400 within a preset time interval (e.g., 3 seconds) after traveling vertically upward by a preset distance or more.

Figure 5:
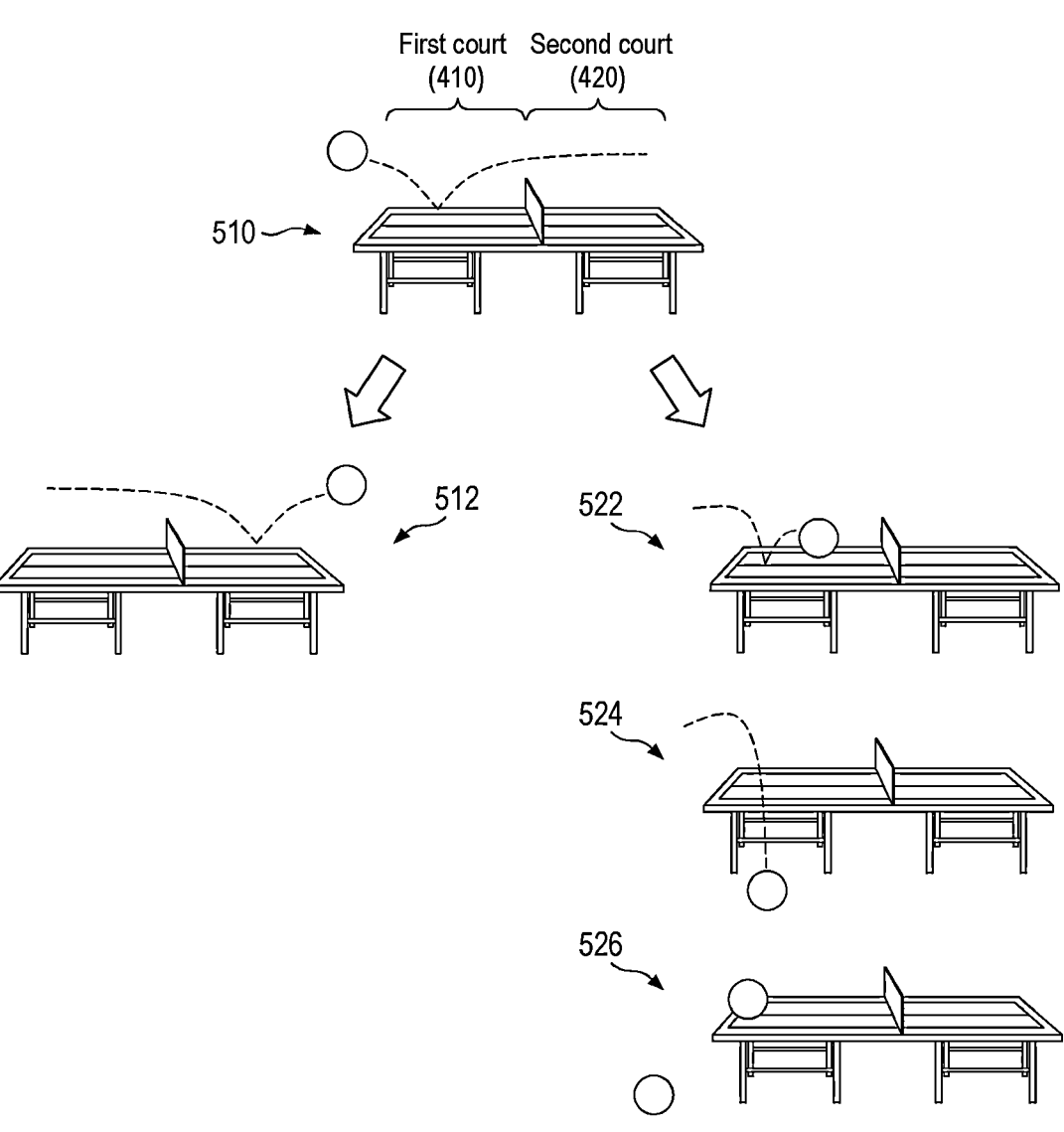
FIG. 5 is a diagram illustrating continuation and end of a rally according to one embodiment of the present disclosure.

FIG. 5 is a diagram illustrating a continuation and end of a rally according to one embodiment of the present disclosure. As described above, the processor 210 of the device 100 may determine the end of a rally. In one embodiment, the processor 210 may determine whether a rally has ended based on information indicative of the playing surface 400 (hereafter referred to as playing surface information) and the ball tracking information 140. In the present disclosure, the playing surface information may include information about the playing surface 400. The playing surface information may include information indicating the position of the playing surface 400 within the playing space 120. In addition, the playing surface information may indicate the areas occupied by both courts 410 and 420 on the playing surface 400, the positions of the center line, end lines, and side lines, the height and position of the net, and the like.

During a rally, the ball may touch one (e.g., a first court 410) of the two courts of the playing surface 400 (510). The processor 210 may determine this based on the playing surface information and the ball tracking information 140. Then, the processor 210 may determine whether the ball has touched the other (e.g., a second court 420) of the two courts within a first time interval (e.g., 3 seconds) set in advance (512), based on the playing surface information and the ball tracking information 140. According to a determination that the ball has touched the other court within the first time interval after touching one court, the processor 210 may determine that the corresponding rally has not ended yet and is ongoing.

On the other hand, according to a determination that the ball has not touched the other court (e.g., the second court 420) within the first time interval after touching one court (e.g., the first court 410), the processor 210 may determine that the corresponding rally has ended. For example, the processor 210 may determine that the corresponding rally has ended if the ball has not touched the second court 420 within the first time interval after touching the first court 410, such as if the ball has touched the first court 410 again after touching the first court 410 (522), or the ball has left the playing surface 400 after touching the first court 410 (524).

In one embodiment, the processor 210 may also determine the end of a rally based on the speed of a ball. The processor 210 may determine the speed of the ball based on the ball tracking information 140. If the speed of the ball is maintained at a certain amount or lower for a second time interval set in advance or longer (e.g., maintained at a speed of 0.2 m/s or lower for 7 seconds or longer), the processor 210 may determine that the corresponding rally has ended. For example, it may be determined that the rally has ended if the ball is stationary in the playing surface 400 or playing space 120 for more than a certain period of time or moves below a certain speed (526).

In one embodiment, the processor 210 may also determine that a rally has ended if it fails to track the ball and cannot track the ball again for a certain period of time. The processor 210 may acquire the ball tracking information 140 from the camera group 110. If the camera group 110 has failed to track the position of the ball, for example, if the ball was covered by a player, table tennis table, or the like or if the ball has left the playing space 120, information about the position of the ball during that time may be missing in the ball tracking information 140. The processor 210 may acquire the corresponding ball tracking information 140 in which the information during the ball tracking failure time is missing, determine whether the ball tracking failure time is equal to or longer than a certain period of time (e.g., 30 seconds), and determine that the corresponding rally has ended if ball tracking has failed for a certain period of time.

According to a determination that the rally has ended, the processor 210 may update the score status of the corresponding match. The processor 210 may determine if a point has been scored in the corresponding rally and which player has scored the point based on the playing surface information and the ball tracking information 140. As described above, the playing surface information may include information indicating the areas occupied by both courts within the playing surface 400. The processor 210 may determine what trajectory the ball has exhibited before the rally ended based on such playing surface information and the ball tracking information 140, and accordingly determine whether there is a point scored and the player who has scored the point. In one embodiment, the processor 210 may determine whether there is a point scored and the player who has scored the point based on which court (410, 420) the ball has touched in the last two instances in which it has touched the playing surface 400 in reverse order from before the rally has ended. For example, if the ball has touched the first court 410 back to back after touching the first court 410, it may be determined that the player located at the end of the second court 420 side has scored. If the ball moves below a certain speed or ball tracking fails after touching the first court 410 and subsequently touching the second court 420, it may be determined that the player located at the end of the first court 410 side has scored.

In one embodiment, the processor 210 may determine if a point has been scored in the corresponding rally and which player has scored the point based further on the player movement information. If the ball has touched the first court 410 immediately after the player on the first court 410 side made a receiving action, it may be determined that the player on the second court 420 side has scored. If the ball has directly touched the second court 420 immediately after the player on the first court 410 side made a serving action, it may be determined that the player on the second court 420 side has scored. Alternatively, if the ball moves below a certain speed or ball tracking fails immediately after the player on the first court 410 side made a serving or receiving action, it may be determined that the player on the second court 420 side has scored.

Once it is determined whether a point has been scored in the corresponding rally and which player has scored the point, the processor 210 may update information indicating the score status of the corresponding sports match (hereinafter referred to as score status information) based on this. That is, the processor 210 may increment the score corresponding to the player who has scored. Further, once it is determined whether a point has been scored in the corresponding rally and which player has scored the point, the processor 210 may determine one of the videos obtained by capturing each player as the second video 160 obtained by capturing the player who has scored in the corresponding rally. Thereafter, the processor 210 may determine the second video 160 as a video to be broadcasted currently and transmit the second video 160 to the video transmission device 170.

Figure 6:
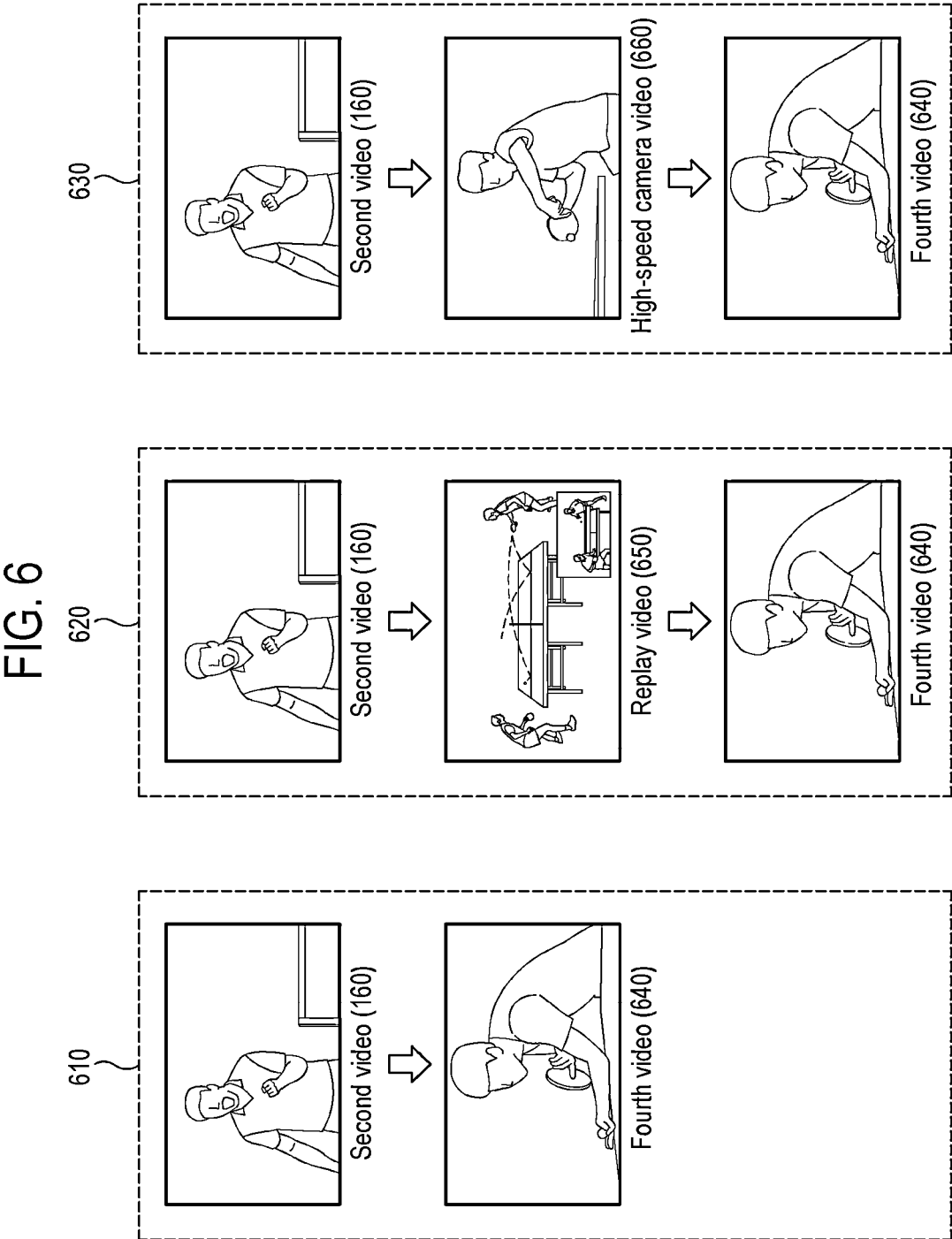
FIG. 6 is a diagram illustrating a process of determining videos to be broadcasted as an end of a rally is determined according to one embodiment of the present disclosure.

FIG. 6 is a diagram illustrating a process of determining videos to be broadcasted as the end of a rally is determined according to one embodiment of the present disclosure. As described above, according to the determination that the rally has ended, the processor 210 may determine the second video 160 obtained by capturing the player who has scored in the corresponding rally among the plurality of videos 130 as a video to be broadcasted currently, and transmit the second video 160 to the video transmission device 170. In one embodiment, the processor 210 may determine another video to be broadcasted after a certain period of time (e.g., seconds) has elapsed since the transmission of the second video 160 and further transmit it to the video transmission device 170.

In one embodiment (610), the processor 210 may further transmit a video (hereinafter referred to as a fourth video 640) obtained by capturing a player who gets to serve in the next rally after the finished rally to the video transmission device 170. The memory 220 may store information indicating the player who served in the finished rally and score status information updated according to the end of the rally. The processor 210 may determine the player who gets to serve in the next rally after the finished rally based on the information indicating the player who served in the finished rally and the score status information updated according to the end of the rally. For example, every time two points are scored, or every time a point is scored if the score status is 10:10, the service may have to be changed to another player or team. If the score status requires the serving player be changed, the processor 210 may determine the player of the opposite team other than the player who served in the finished rally as the player who gets to serve in the next rally. If the score status requires the serving player not to be changed, the processor 210 may determine the player who served in the finished rally as the player who gets to serve in the next rally as well.

As the player who gets to serve in the next rally is determined, the processor 210 may determine the fourth video 640 obtained by capturing the player who gets to serve in the next rally among the plurality of videos 130. After transmitting the second video 160, the processor 210 may control the communication circuit 230 to transmit the fourth video 640 to the video transmission device 170. In one embodiment, the fourth video 640 may be transmitted to the video transmission device 170 after a certain period of time (e.g., 5 seconds) has elapsed since the transmission of the second video 160. Accordingly, the video transmission device 170 may stop the transmission of the second video 160 that was being transmitted previously and start transmitting the fourth video 640.

In one embodiment (620, 630), the processor 210 may determine a video to be further transmitted to the video transmission device 170 after the second video 160 based on the number of times the ball has reciprocated between both courts in the finished rally. Specifically, the processor 210 may determine the number of times the ball has reciprocated between both courts in the finished rally based on the ball tracking information 140. The processor 210 may compare the determined number of times the ball has reciprocated with preset reference numbers.

According to a determination that the number of times the ball has reciprocated is greater than or equal to a first number (e.g., 10 times) set in advance, the processor 210 may transmit a replay video 650 for the finished rally to the video transmission device 170. For example, after transmitting the second video 160, the processor 210 may control the communication circuit 230 to transmit the replay video 650 and the fourth video 640 in sequence to the video transmission device 170 (620). In one embodiment, after a certain period of time (e.g., 5 seconds) has elapsed since the transmission of the second video 160, the replay video 650 and the fourth video 640 may be transmitted to the video transmission device 170 in sequence at certain time intervals, respectively. Accordingly, the video transmission device 170 may stop the transmission of the second video 160 that was being transmitted previously, transmit the replay video 650, and then transmit the fourth video 640 again after a certain period of time has elapsed.

According to a determination that the number of times the ball has reciprocated is less than or equal to a second number (e.g., one time) set in advance, the processor 210 may transmit a high-speed camera video 660 for the finished rally to the video transmission device 170. The second number may be a number less than the first number. For example, when a point is scored by a service (service point, the number of times the ball has reciprocated is 0), the high-speed camera video 660 may be utilized for broadcasting. After transmitting the second video 160, the processor 210 may control the communication circuit 230 to transmit the high-speed camera video 660 and the fourth video 640 in sequence to the video transmission device 170 (630). In one embodiment, after a certain period of time (e.g., 5 seconds) has elapsed since the transmission of the second video 160, the high-speed camera video 660 and the fourth video 640 may be transmitted to the video transmission device 170 in sequence at certain time intervals, respectively. Accordingly, the video transmission device 170 may stop the transmission of the second video 160 that was being transmitted previously, transmit the high-speed camera video 660, and then transmit the fourth video 640 again after a certain period of time has elapsed.

In one embodiment, the high-speed camera video 660 may be a high-speed camera video for a portion of the finished rally. In one embodiment, a video obtained by capturing from the rally start point to the rally end point of the finished rally with a high-speed camera may be determined as the high-speed camera video 660. In one embodiment, a video captured by the high-speed camera for a certain time interval (e.g., 10 seconds) may also be determined as the high-speed camera video 660, based on the time point at which the ball has approached the net, end lines, or side lines within a certain distance, the time point at which the instantaneous speed of the ball was greater than or equal to a certain value, the time point at which the amount of change in the player's position in the playing space 120 or the amount of change in the player's movement was greater than or equal to a certain value, etc., during the finished rally. The processor 210 may generate the high-speed camera video 660 based on the ball tracking information 140, the player movement information, and the like.

In one embodiment, the processor 210 may also transmit at least two videos selected among the second video 160, the replay video 650, the high-speed camera video 660, and the fourth video 640 to the video transmission device 170 in sequence according to a predetermined order.

Figure 7:
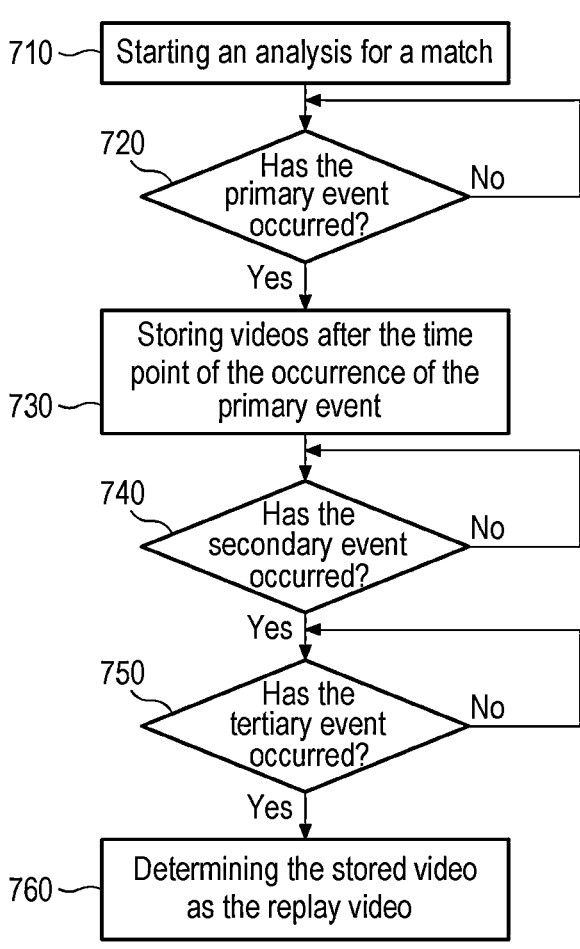
FIG. 7 is a diagram illustrating a process of generating a replay video according to one embodiment of the present disclosure.

FIG. 7 is a diagram illustrating a process of generating a replay video 650 according to one embodiment of the present disclosure. The processor 210 may generate the replay video 650 for rallies in various ways.

In one embodiment, the processor 210 may determine a time interval from the time point at which the rally is determined to have started to the time point at which the corresponding rally is determined to have ended. The method of determining the start and end of a rally is as described above. The processor 210 may determine one video among the plurality of videos 130 corresponding to the corresponding time interval as the replay video 650. For example, the processor 210 may extract a video portion from the start to the end of the rally from a video obtained by capturing the entire playing space 120 among the plurality of videos 130, and then determine the extracted portion as the replay video 650.

In one embodiment, the processor 210 may detect the occurrence of various events during a sports match and generate the replay video 650 in response to the occurrence of the corresponding events. The processor 210 may determine that certain events have occurred in a match based on the plurality of videos 130, the ball tracking information 140, the player movement information, the umpire movement information, etc., from the camera group 110. The processor 210 may determine a time interval from the time point at which a particular event had occurred to the time point at which another particular event has occurred, and determine one video among the plurality of videos 130 corresponding to the corresponding time interval as the replay video 650.

In one embodiment, the processor 210 may start to separately store a video from the time point at which one particular event (hereinafter referred to as a primary event) has occurred, and when it is detected that two other particular events (hereinafter referred to as a secondary event and a tertiary event) have occurred sequentially, the processor 210 may also determine the video from the primary event to the tertiary event as the replay video 650.

Specifically, the processor 210 may perform an analysis for the corresponding match based on the plurality of videos 130, the ball tracking information 140, the player movement information, the umpire movement information, and the like (710). According to the analysis process, the processor 210 may determine that the primary event has occurred during the match (720). If the primary event has not occurred, the analysis process for the match continues. The primary event may be, for example, "the start of a rally." The method of determining the start of a rally is as described above. The processor 210 may select one video among the plurality of videos 130 (e.g., a video obtained by capturing the entire playing space). The processor 210 may start to separately store a video after the time point of the occurrence of the primary event for the selected video (730). In parallel with detecting the primary event and storing the video, the processor 210 may continue to perform the analysis process of the match.

The processor 210 may determine that the secondary event has occurred after the primary event according to the analysis process (740). If the secondary event has not occurred, the analysis process for the match continues. The secondary event may be, for example, that "The number of times the ball has reciprocated between both courts in the rally has reached the first number." The number of times the ball has reciprocated may be determined based on the ball tracking information 140 or the like, as described above. The processor 210 may continue to store the video that has been stored since the detection of the primary event. Also, the processor 210 may continue to perform the analysis process of the match.

The processor 210 may determine that the tertiary event has occurred after the secondary event according to the analysis process (750). If the tertiary event has not occurred, the analysis process for the match continues. The tertiary event may be, for example, "the end of the rally." The method of determining the end of the rally is as described above. The processor 210 may extract a partial video corresponding to the time interval from the occurrence of the primary event to the occurrence of the tertiary event from the previously selected video and determine it as the replay video 650 (760). The processor 210 may transmit the replay video 650 to the video transmission device 170, as described above.

In one embodiment, if the occurrence of the secondary event is not detected for a preset time interval or longer after the occurrence of the primary event, or if the occurrence of the tertiary event is not detected for a preset time interval or longer after the occurrence of the secondary event, the process of generating the replay video in progress may be stopped, and the process of generating the replay video may be restarted from the beginning (710).

In one embodiment, each of the primary to tertiary events may be set to various events. For example, "The ball has approached the net, end lines, or side lines within a certain distance," "The instantaneous speed of the ball has reached a certain value or higher," "The amount of change in the player's position in the playing space 120 or the amount of change in the player's movement has reached a certain value or higher," "The ball has moved from one court to another after serving," or the like may be set as the secondary event.

In one embodiment, the occurrence of an event may also be determined by setting a particular area within the playing space 120 as a search area and based on the movement of the ball or the player within the corresponding search area. For example, a virtual plane passing through the center line may be assumed and set as the search area, and a ball passing through the corresponding search area may be set as the secondary event. The processor 210 may determine the corresponding secondary event based on the search area and the ball tracking information 140. For example, in the case of baseball, by setting a certain portion of the pitcher's mound as the search area and based on the search area and the movement information of the pitcher, if it is determined that the pitcher has thrown a baseball, this may be determined as the primary event. A case where "The batter has hit the baseball thrown by the pitcher" or "It is detected that a ball or strike has occurred from a video obtained by capturing a video of the electronic scoreboard" may be determined as the secondary event. In addition, a case where "It is detected that an out count has changed or a score has resulted from a video obtained by capturing the electronic scoreboard" may be determined as the tertiary event.

In one embodiment, the processor 210 may generate the replay video 650 by performing slow playback (e.g., 0.8× playback) processing on particular videos in the method described above. In one embodiment, the processor 210 may also include a real-time video (e.g., a video obtained by capturing the entire playing space) of the corresponding match in the form of a PIP (Picture-In-Picture) in one area (e.g., the lower right corner of the video) of the replay video 650.

Figure 8:
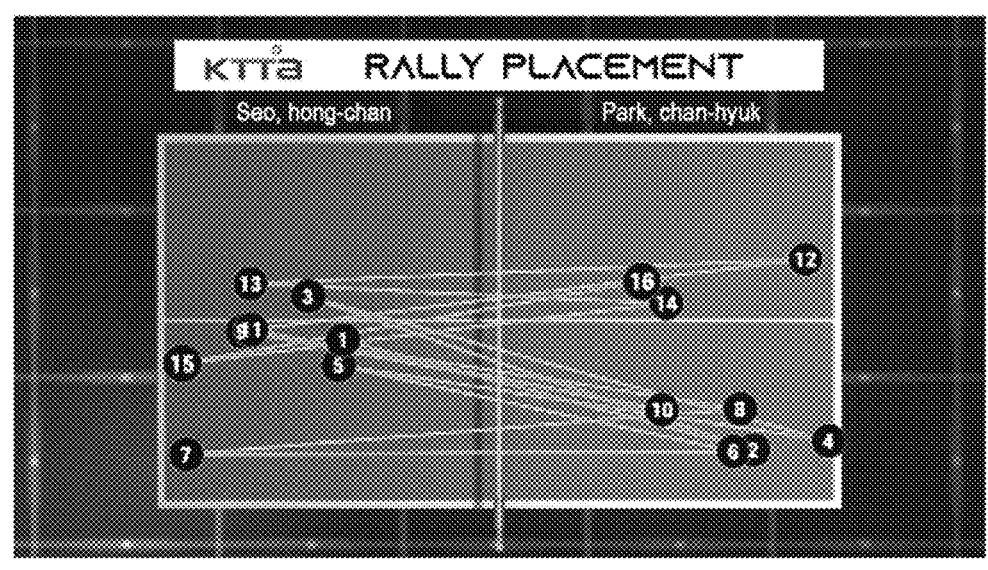
FIG. 8 is a view illustrating a rally analysis video according to one embodiment of the present disclosure.

FIG. 8 is a view illustrating a rally analysis video according to one embodiment of the present disclosure. The rally analysis video may include analysis information on the corresponding rally. The analysis information on the rally may include information indicating in time series the locations where the ball has touched the playing surface 400 in the corresponding rally. The rally analysis video according to the illustrated embodiment displays at which points on each court of the playing surface 400 the ball has touched during the rally in the order of touch. According to embodiments, each time point at which the ball has touched may also be displayed.

The processor 210 may generate analysis information on a rally based on the plurality of videos 130, the ball tracking information 140, the player movement information, the umpire movement information, and the like. The processor 210 may generate a rally analysis video based on the analysis information on a rally in a variety of situations. The processor 210 may transmit the generated rally analysis video to the video transmission device 170 so as to be broadcasted. In one embodiment, the processor 210 may generate a rally analysis video based on the analysis information on a rally upon receiving an input instructing to generate a rally analysis video.

In one embodiment, the processor 210 may generate a rally analysis video based on the analysis information on the rally if the number of times the ball has reciprocated between both courts in the finished rally is equal to or greater than a preset number. In one embodiment, the processor 210 may generate a rally analysis video based on the analysis information on the rally when the start of the next rally is delayed for a certain period of time or more. In one embodiment, the processor 210 may determine whether it is a break time during the match based on the score status information updated according to the end of the rally, and according to the determination that it corresponds to a break time, may generate a rally analysis video based on the analysis information on the rally prior to the break time. For example, if the sum of the scores of both players or both teams is a multiple of 6 and thus toweling (time to wipe sweat) is given, a rally analysis video may be generated and transmitted to the video transmission device 170.

In one embodiment, when a drive contention occurs during a rally, the processor 210 may also generate a rally analysis video including the analysis information on the corresponding rally. The processor 210 may determine whether a drive contention has occurred during the rally based on the ball tracking information 140. Specifically, the processor 210 may determine an average value of horizontal speeds of the ball within the rally based on the ball tracking information 140. The processor 210 may compare the corresponding average value with a preset value. According to a determination that the corresponding average value is greater than or equal to the preset value, the processor 210 may generate a rally analysis video including the analysis information on the corresponding rally. In one embodiment, the processor 210 may control the communication circuit 230 to transmit the corresponding rally analysis video to the video transmission device 170 before transmitting the fourth video 640. For example, the rally analysis video may be transmitted to the video transmission device 170 before or after transmitting the replay video 650 and before or after transmitting the high-speed camera video 660. In one embodiment, the processor 210 may also include a real-time video (e.g., a video obtained by capturing the entire playing space) of the corresponding match in the form of a PIP in one area (e.g., the lower right corner of the video) of the high-speed camera video 660.

Figure 9:
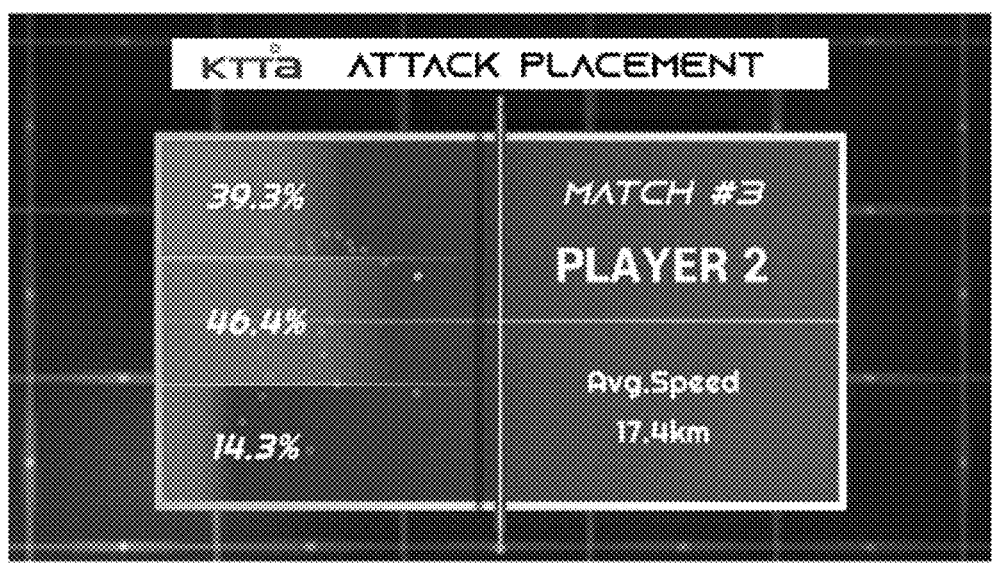
FIG. 9 is a view illustrating a game analysis video according to one embodiment of the present disclosure.

FIG. 9 is a view illustrating a game analysis video according to one embodiment of the present disclosure. A match can consist of an odd number of games. For example, one table tennis match may be played in a best-of-seven series with a maximum of seven games. A player or team that scores 11 points first will win in each game. A game analysis video may include analysis information on the corresponding game. The analysis information on the game may include at least one piece of information selected among service directions, service success rates, attack directions (locations where the ball touched the playing surface when the attack was successful), and attack success rates for each player (or team) in the corresponding game. In one embodiment, the analysis information on the game may further include average speed information of the ball hit by a particular player in the corresponding game. The game analysis video according to the illustrated embodiment shows that the attack direction of player 2 in the third game is the top section with 39.3%, the middle section with 46.4%, and the bottom section with 14.3%. It also shows that the average speed of the ball hit by player 2 is 17.4 km/h.

The processor 210 may generate analysis information on a game based on the plurality of videos 130, the ball tracking information 140, the player movement information, the umpire movement information, and the like. In one embodiment, the processor 210 may generate a game analysis video based on the analysis information on the game when it is determined that one game has ended in view of the score status. Specifically, the processor 210 may determine whether the game including the corresponding rally has ended based on the score status information updated according to the end of the rally (e.g., when one player reaches 11 points, etc.). According to a determination that the game has ended, the processor 210 may generate a game analysis video including the analysis information on the corresponding game. In one embodiment, the processor 210 may also generate a game analysis video based on the analysis information on a game upon receiving an input instructing to generate a game analysis video. Once the game analysis video is generated, the processor 210 may control the communication circuit 230 to transmit the game analysis video to the video transmission device 170. Accordingly, the corresponding game analysis video may be broadcasted.

Figure 10:
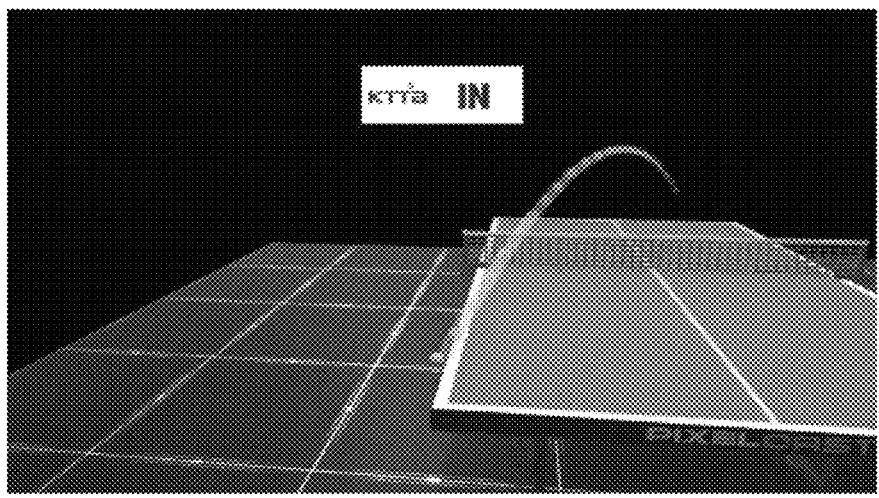
FIG. 10 is a view illustrating a Video Assistant Referee (VAR) video according to one embodiment of the present disclosure.

FIG. 10 is a view illustrating a Video Assistant Referee (VAR) video according to one embodiment of the present disclosure. A VAR video may be a video for providing information to assist an umpire in making a decision in cases where it is difficult to make the decision in sports matches. The VAR video may provide information to assist in various decisions related to whether a ball is in/out of a line, whether the ball has touched a table tennis racket, and other points scored or lost. The VAR video according to the illustrated embodiment displays a trajectory of a ball during a rally in computer graphics.

The processor 210 may generate a VAR video based on the plurality of videos 130, the ball tracking information 140, the player movement information, the umpire movement information, and the like. For example, a VAR video displaying the trajectory of the ball in computer graphics based on the ball tracking information 140 may be generated. The processor 210 may generate VAR videos in a variety of situations. In one embodiment, the processor 210 may generate a VAR video based on various types of information upon receiving an input instructing to generate a VAR video. The processor 210 may transmit the generated VAR video to the video transmission device 170 so as to be broadcasted.

FIG. 11 is a diagram illustrating a method 1100 of determining broadcast videos according to one embodiment of the present disclosure. The method 1100 of determining broadcast videos may be performed by the device 100. The method 1100 may include: acquiring ball tracking information from a camera group (S1110); determining the start or end of a rally based on the ball tracking information (S1120); transmitting a first video obtained by capturing the playing space of a match to a video transmission device (S1130); and/or transmitting a second video obtained by capturing the player who has scored in the rally to the video transmission device (S1140).

In step S1110, the processor 210 may acquire the ball tracking information 140 from the camera group 110 through the communication circuit 230. In step S1120, the processor 210 may determine the start or end of the corresponding rally based on the ball tracking information 140. According to a determination that the rally has started, the processor 210 may control the communication circuit 230 to transmit the first video 150 among the plurality of videos 130 to the video transmission device 170 (step S1130). According to a determination that the rally has ended, the processor 210 may control the communication circuit 230 to transmit the second video 160 among the plurality of videos 130 to the video transmission device 170 (step S1140).

In one embodiment, the method 1100 may further include: acquiring, by the processor 210, player movement information from the camera group 110 through the communication circuit 230 prior to the start of a rally; determining, by the processor 210, whether a rally is ready to start based on the player movement information; and/or according to a determination that a rally is ready to start, transmitting, by the processor 210, a third video 320 among the plurality of videos 130 to the video transmission device 170 by controlling the communication circuit 230.

In one embodiment, step S1120 may include determining that a rally has started based on whether the ball has touched the playing surface 400 in the playing space 120 within a preset time interval after traveling vertically upward by a preset distance or more.

In one embodiment, step S1120 may include determining that the rally has ended based on the playing surface information and/or the ball tracking information 140.

In one embodiment, step S1140 may include: according to a determination that the rally has ended, determining whether there is a point scored in the rally and a player who has scored the point in the rally based on the playing surface information and/or the ball tracking information 140; and/or based on whether there is a point scored and the player who has scored the point, updating score status information and determining the second video 160 among the plurality of videos 130.

In one embodiment, step S1140 may further include: determining a player who gets to serve in the next rally of the corresponding rally based on the information indicating the player who gets to serve in the corresponding rally and/or the updated score status information; and/or transmitting a fourth video 640 among the plurality of videos 130 to the video transmission device 170 by controlling the communication circuit 230 after transmitting the second video 160.

In one embodiment, the transmitting the fourth video 640 to the video transmission device 170 may include: determining, by the processor 210, the number of times the ball has reciprocated between both courts in the rally based on the ball tracking information 140; according to a determination that the number of times the ball has reciprocated is greater than or equal to a first number, transmitting, by the processor 210, a replay video 650 and the fourth video 640 in sequence to the video transmission device 170 after transmitting the second video 160; and/or according to a determination that the number of times the ball has reciprocated is less than or equal to a second number, transmitting, by the processor 210, a high-speed camera video 660 and the fourth video 640 in sequence to the video transmission device 170 after transmitting the second video 160.

The methods according to the present disclosure may be computer-implemented methods. Although each step of the corresponding methods has been shown and described in a predetermined order in the present disclosure, the respective steps may also be performed in an order that can be combined arbitrarily according to the present disclosure, in addition to being performed sequentially. In one embodiment, at least some of the steps may be performed in parallel, iteratively, or heuristically. The present disclosure does not exclude making changes or modifications to the corresponding methods. In one embodiment, at least some steps may be omitted or other steps may be added.

Various embodiments of the present disclosure may be implemented in software recorded on a machine-readable recording medium. The software may be software for implementing the various embodiments of the present disclosure described above. Software may be inferred from the various embodiments of the present disclosure by programmers skilled in the art to which the present disclosure pertains. For example, the software may be machine-readable commands (e.g., code or code segments) or programs. The machine is a device operable according to instructions invoked from a recording medium, and may be, for example, a computer. In one embodiment, the machine may be the device 100 according to embodiments of the present disclosure. In one embodiment, the processor of the machine may execute the invoked command to cause the components of the machine to perform the function corresponding to the command. In one embodiment, the processor may be the processor 210 according to embodiments of the present disclosure. The recording medium may refer to any type of recording medium on which machine-readable data are stored. The recording medium may include, for example, ROM, RAM, CD-ROM, magnetic tapes, floppy disks, optical data storage devices, and the like. In one embodiment, the recording medium may be the memory 220. In one embodiment, the recording medium may also be implemented as a form distributed over a computer system connected by a network, or the like. The software may be stored in a distributed manner and executed on a computer system or the like. The recording medium may be a non-transitory recording medium. The non-transitory recording medium refers to a tangible medium regardless of whether data is stored semi-permanently or temporarily, and does not include transitory propagating signals.

Although the technical idea of the present disclosure has been described by various embodiments, the technical idea of the present disclosure includes various substitutions, modifications, and changes that can be made within the scope that can be understood by those skilled in the art to which the present disclosure pertains. Further, it should be understood that such substitutions, modifications, and changes may fall within the scope of the appended claims. The embodiments according to the present disclosure may be combined with each other. The respective embodiments can be combined in various ways depending on the number of cases, and embodiment made in combinations also fall within the scope of the present disclosure.

What is claimed is:

1. A device for determining a video for broadcasting a sports match among a plurality of videos of the match captured by a camera group, the device comprising:
  a communication circuit configured to communicate with the camera group and a video transmission device;
  one or more processors; and
  one or more memories configured to store instructions that, when executed by the one or more processors, cause the one or more processors to perform operations,
  wherein the one or more processors:
  acquire ball tracking information for tracking a ball used in the match from the camera group through the communication circuit;
  determine a start of a first rally within the match based on the ball tracking information;
  determine that the first rally has ended if the ball has not touched a first court of the playing surface within a first time interval set in advance after touching a second court, which is an opposite court of the first court of the playing surface, or a speed of the ball maintains a certain amount or lower for a second time interval set in advance or longer, based on playing surface information indicating a playing surface in the playing space and the ball tracking information;
  transmit, according to a determination that the first rally has started, a first video obtained by capturing a playing space of the match among the plurality of videos to the video transmission device by controlling the communication circuit; and
  transmit, according to a determination that the first rally has ended, a second video obtained by capturing a player who has scored in the first rally among the plurality of videos to the video transmission device by controlling the communication circuit.

2. The device of claim 1, wherein the one or more processors:

acquire player movement information for tracking movements of players from the camera group through the communication circuit prior to before the start of the first rally;
  determine whether the first rally is ready to start based on the player movement information; and
  according to a determination that the first rally is ready to start, transmit a third video obtained by capturing a player who gets to serve in the first rally among the plurality of videos to the video transmission device by controlling the communication circuit.

3. The device of claim 1, wherein the one or more processors:
  determine that the first rally has started based on whether the ball has traveled vertically upward by a preset distance or more.

4. The device of claim 3, wherein the one or more processors:
  determine that the first rally has started based on whether the ball has touched a playing surface in the playing space within a preset time interval after traveling vertically upward by the preset distance or more.

5. The device of claim 1, wherein the one or more processors:
  determine, according to a determination that the first rally has ended, whether a point has been scored in the first rally and a player who has scored the point in the first rally based on the playing surface information and the ball tracking information; and
  update score status information of the match and determine the second video among the plurality of videos based on whether a point has been scored and the player who has scored the point.

6. The device of claim 5, wherein the one or more processors:
  determine a player who gets to serve in a second rally subsequent to the first rally based on information indicating a player who gets to serve in the first rally and the updated score status information; and
  transmit a fourth video obtained by capturing the player who gets to serve in the second rally among the plurality of videos to the video transmission device by controlling the communication circuit after transmitting the second video.

7. The device of claim 6, wherein the one or more processors:
  determine the number of times the ball has reciprocated between both courts in the first rally based on the ball tracking information;
  transmit, according to a determination that the number of times the ball has reciprocated is greater than or equal to a first number, a replay video of the first rally and the fourth video in sequence to the video transmission device after transmitting the second video; and
  transmit, according to a determination that the number of times the ball has reciprocated is less than or equal to a second number that is less than the first number, a high-speed camera video obtained by capturing the first rally with a high-speed camera and the fourth video in sequence to the video transmission device after transmitting the second video.

8. The device of claim 7, wherein the one or more processors:
  generate the replay video based on at least one video corresponding to a time interval from a time point at which the first rally is determined to have started to a time point at which the first rally is determined to have ended among the plurality of videos.

9. The device of claim 6, wherein the one or more processors:

determine an average value of horizontal speeds of the ball in the first rally based on the ball tracking information;

generate, according to a determination that the average value is greater than or equal to a preset value, a rally analysis video including analysis information on the first rally; and transmit the rally analysis video to the video transmission device by controlling the communication circuit before transmitting the fourth video, wherein the analysis information on the first rally includes information indicating, in time series, locations where the ball has touched on the playing surface in the first rally.

10. The device of claim 5, wherein the one or more processors:

determine that a game including the first rally has ended based on the score status information;

generate, according to a determination that the game has ended, a game analysis video including analysis information on the game; and transmit the game analysis video to the video transmission device by controlling the communication circuit, wherein the analysis information on the game includes at least one piece of information selected among service directions, service success rates, attack directions, and attack success rates for each player in the game.

11. A method for determining a video for broadcasting a sports match among a plurality of videos of the match captured by a camera group, the method comprising:

acquiring, by one or more processors, ball tracking information for tracking a ball used in the match from the camera group through a communication circuit;

determining a start of a first rally within the match based on the ball tracking information;

determining that the first rally has ended if the ball has not touched a first court of the playing surface within a first time interval set in advance after touching a second court, which is an opposite court of the first court of the playing surface, or a speed of the ball maintains a certain amount or lower for a second time interval set in advance or longer, based on playing surface information indicating a playing surface in the playing space and the ball tracking information;

transmitting, according to a determination that the first rally has started, a first video obtained by capturing a playing space of the match among the plurality of videos to a video transmission device by controlling the communication circuit; and transmitting, according to a determination that the first rally has ended, a second video obtained by capturing a player who has scored in the first rally among the plurality of videos to the video transmission device by controlling the communication circuit.

12. The method of claim 11, further comprising:

acquiring, by the one or more processors, player movement information for tracking movements of players from the camera group through the communication circuit before the start of the first rally;

determining, by the one or more processors, whether the first rally is ready to start based on the player movement information; and according to a determination that the first rally is ready to start, transmitting, by the one or more processors, a third video obtained by capturing a player who gets to serve in the first rally among the plurality of videos to the video transmission device by controlling the communication circuit.

13. The method of claim 11, wherein the determining the start of the first rally within the match comprises:

determining that the first rally has started based on whether the ball has touched a playing surface in the playing space within a preset time interval after traveling vertically upward by a preset distance or more.

14. The method of claim 11, wherein the transmitting the second video to the video transmission device comprises:

determining, according to a determination that the first rally has ended, whether a point has been scored in the first rally and a player who has scored the point in the first rally based on the playing surface information and the ball tracking information; and updating score status information of the match and determining the second video among the plurality of videos based on whether a point has been scored and the player who has scored the point.

15. The method of claim 14, wherein the transmitting the second video to the video transmission device further comprises:

determining a player who gets to serve in a second rally subsequent to the first rally based on information indicating a player who gets to serve in the first rally and the updated score status information; and transmitting a fourth video obtained by capturing the player who gets to serve in the second rally among the plurality of videos to the video transmission device by controlling the communication circuit after transmitting the second video.

16. The method of claim 15, wherein the transmitting the fourth video to the video transmission device comprises:

determining the number of times the ball has reciprocated between both courts in the first rally based on the ball tracking information;

transmitting, according to a determination that the number of times the ball has reciprocated is greater than or equal to a first number, a replay video of the first rally and the fourth video in sequence to the video transmission device after transmitting the second video; and transmitting, according to a determination that the number of times the ball has reciprocated is less than or equal to a second number that is less than the first number, a high-speed camera video obtained by capturing the first rally with a high-speed camera and the fourth video in sequence to the video transmission device after transmitting the second video.

17. A non-transitory computer-readable recording medium having recorded thereon instructions that, when executed by one or more processors, cause the one or more processors to perform operations, wherein the instructions are configured to cause the one or more processors to:

acquire ball tracking information for tracking a ball used in a sports match from a camera group through a communication circuit;

determine a start of a first rally within the match based on the ball tracking information;

determine that the first rally has ended if the ball has not touched a first court of the playing surface within a first time interval set in advance after touching a second court, which is an opposite court of the first court of the playing surface, or a speed of the ball maintains a certain amount or lower for a second time interval set in advance or longer, based on playing surface information indicating a playing surface in the playing space and the ball tracking information;

transmit, according to a determination that the first rally has started, a first video obtained by capturing a playing space of the match among a plurality of videos of the match captured by the camera group to a video transmission device by controlling the communication circuit; and transmit, according to a determination that the first rally has ended, a second video obtained by capturing a player who has scored in the first rally among the plurality of videos to the video transmission device by controlling the communication circuit.

* * * * *